(12) United States Patent
Ouellette

(10) Patent No.: US 6,547,059 B2
(45) Date of Patent: Apr. 15, 2003

(54) CONVEYOR ROW FORMER FOR OBJECTS HAVING UNEVEN CROSS SECTION WIDTHS

(75) Inventor: Joseph F. Ouellette, Glendale, MO (US)

(73) Assignee: Ouellette Machinery Systems, Inc., Fenton, MO (US)

( * ) Notice: Subject to any disclaimer, the term of this patent is extended or adjusted under 35 U.S.C. 154(b) by 92 days.

(21) Appl. No.: 09/801,890

(22) Filed: Mar. 8, 2001

(65) Prior Publication Data

US 2002/0125104 A1 Sep. 12, 2002

(51) Int. Cl.[7] .......................... B65G 47/26; B65G 25/00
(52) U.S. Cl. ..................... 198/456; 198/427; 198/430
(58) Field of Search ................................. 198/427, 430, 198/456

(56) References Cited

U.S. PATENT DOCUMENTS

| | | | | |
|---|---|---|---|---|
| 3,244,266 A | * | 4/1966 | Zappia et al. ................ | 198/430 |
| 3,724,639 A | * | 4/1973 | Hara ........................... | 198/430 |
| 3,960,266 A | * | 6/1976 | Becker ........................ | 198/430 |
| 3,973,666 A | * | 8/1976 | Hardy .......................... | 198/427 |
| 3,993,183 A | * | 11/1976 | Stengle, Jr. ................. | 198/429 |
| 5,472,077 A | * | 12/1995 | Bolin .......................... | 198/430 |
| 6,044,962 A | * | 4/2000 | Vaughn ....................... | 198/597 |

* cited by examiner

Primary Examiner—Christopher P. Ellis
Assistant Examiner—Gene O. Crawford
(74) Attorney, Agent, or Firm—Thompson Coburn LLP

(57) ABSTRACT

A row former of a conveying system is provided with a plurality of protrusions projecting from a side of a row forming arm that engage with portions of objects arranged in a row and pushed before the arm across a row forming table surface and prevent relative movement of the objects in the row.

23 Claims, 5 Drawing Sheets

CONVEYOR ROW FORMER FOR OBJECTS HAVING UNEVEN CROSS SECTION WIDTHS

BACKGROUND OF THE INVENTION (1) Field of the Invention

The present invention pertains to a row former that is part of a conveying system that receives a number of objects conveyed by the conveying system and arranges the number of objects received in a row, and then positions sequentially arranged rows of the objects side by side forming a two dimensional array of the objects. In particular, the present invention pertains to a novel row former that is designed to prevent relative movement between objects arranged in a row and being positioned by the row former adjacent a previously arranged row, where the objects have uneven or irregular cross section widths.

(2) Description of the Related Art

Conveying systems for conveying objects, for example lightweight blow molded plastic bottles, typically include portions of the conveying system that quickly convey one or more single file streams of the objects from one station of the conveying system to another station, for example from a blow molding station where plastic bottles are formed to a downstream palletizing station where the blow molded bottles are arranged on pallets. Conveying systems also often include row forming conveyors that receive objects from the one or more single file streams of conveyed objects, arrange predetermined numbers of the objects in rows and position the rows side by side on a row accumulating table forming two dimensional arrays of the objects. Forming the objects in the two dimensional arrays is usually done prior to palletizing of the arrayed objects in stacked layers, for example in cartons, on sheets or on pallets that are later wrapped in shrink wrap or bound.

The typical row forming conveyor is comprised of a conveyor belt on which numbers of the conveyed objects are arranged in rows and then positioned side by side on the accumulating table in forming the two dimensional arrays of the objects. The typical row forming conveyor also includes a row former that receives a number of objects from the stream of objects conveyed to the row forming conveyor and arranges a number of objects in a row and then positions sequentially arranged rows of objects side by side on the accumulating table in forming the two dimensional array.

The row former includes a pair of spaced, parallel arms that define a row forming slot between the arms. The arms are positioned above the row forming conveyor where the slot between the arms receives a number of objects from the stream of objects conveyed by the row forming conveyor between the slot of the arms. The arms arrange the number of objects received in the slot in a row between the arms. With the number of objects filling the slot of the row former, the conveyed stream of objects is held back by a gate and the row former with the arranged row of objects moves in a direction perpendicular to the row a short distance across the row forming conveyor and onto a surface of the accumulating table. The arms of the row former then stop and move vertically upward from the accumulating table surface, leaving the number of objects in the first arranged row on the accumulating table surface.

The pair of row former arms are then moved in the opposite direction across the row accumulating table surface back to their position in line with the conveyor conveying the stream of objects to the row forming conveyor. The arms are then moved vertically downward aligning the slot between the pair of arms again with the conveyor conveying the stream of objects. The gates of the conveyor are opened and the slot between the row former arms is again filled with a number of objects, upon which the gates of the conveyor are closed. The pair of arms with the number of objects arranged in the second row between the arms are then moved a short distance across the row forming conveyor and onto the surface of the row accumulating table, positioning the second arranged row adjacent the first arranged row of objects. As the pair of arms is moved across the row forming conveyor surface moving the second arranged row of objects a sufficient distance to clear the position the row former occupies when it receives the number of objects from the conveyor, the forward most arm of the row former pushes the first arranged row of objects in front of the forward most arm, sliding the first arranged row of objects a short distance across the row accumulating table. Once the area of the row forming conveyor that the pair of arms occupy when receiving the number of objects from the conveyor is cleared, the pair of row former arms are again moved upwardly leaving the second arranged row of objects adjacent the first arranged row of objects. The arms then move back over the row forming conveyor to their positions where they will receive the next number of objects arranged in a row in the slot between the row forming arms. The sequence of movements of the row former arms are repeated with previously arranged rows of objects being pushed across the row accumulating table surface by subsequently arranged rows of objects that are in turn pushed across the row accumulating table surface by the movement of the forward most forming arm, thereby positioning rows of numbers of objects side by side in forming a two dimensional array of the objects on the row accumulating table surface.

Prior art row accumulating tables have worked well in arranging numbers of objects in rows and then positioning the rows side by side in forming a two dimensional array of the objects where the objects being formed in the array are symmetric about their center vertical axes. Plastic blow molded bottles that are symmetric about their center vertical axes that pass through the centers of the bottle necks are examples of such objects. With each of the individual objects or bottles in an arranged row being symmetric about its center vertical axis, it did not matter if the object was rotated or caused to move slightly about its center axis as the row former forward arm pushed the row of objects across the row forming conveyor and onto the row accumulating table surface because the relative orientations of the bottles in the pushed row and in the previously positioned rows on the row accumulating table surface would remain unchanged.

However, difficulties were encountered in positioning rows of plastic blow molded bottles side by side in forming two dimensional arrays when the shapes of the bottles changed from the conventional shape symmetric about its center axis, to an asymmetric shape having an uneven width dimension across a cross section of the bottle. For example, blow molded plastic bottle designs were developed having general trapezoidal shaped cross sections, with handles formed as pinched in indentations at one side of the bottles. Forming a bottle in this shape would result in the bottle having a cross section that is narrower at one side of the bottle, the side formed with the pinched in handle indentations, than at its opposite side. Bottles molded with these configurations, when arranged by a row former in a row with the narrower sides of the bottles abutting against the wider sides of adjacent bottles, would at times rotate or move about the center vertical axes of the bottle necks when the forward arm of the row former would push the arranged row of bottles across the row accumulating table surface. This would result in one or more of the bottles positioned in the side by side rows of bottles of the two dimensional array being rotated or moved slightly relative to the other bottles of the same row or adjacent rows, which would ultimately create problems in the palletizing of the two dimensional array of bottles in a carton or on a pallet.

To overcome this problem, a mechanism is needed that prevents the relative movement of bottles having uneven cross section widths as rows of the bottles are positioned side by side by a row former in forming a two dimensional array of the bottles on a row accumulating table surface.

SUMMARY OF THE INVENTION

The present invention overcomes the disadvantages associated with prior art row formers by providing a row former having an arm with a plurality of protrusions that engage with the narrower width portions of bottles previously arranged in a row by the row former on the row accumulating table and prevent relative movement between the bottles of the row as the arm pushes sequential rows of bottles across the surface of the row accumulating table.

The row former of the present invention employs several features of row formers of the prior art, and additional novel features that enable the row former to move rows of irregularly shaped objects (or objects having uneven widths across their cross sections) across a row forming conveyor surface and onto a row accumulating table while preventing relative disorienting movement of objects in a previously arranged row that have been pushed onto the row accumulating table surface. The row former works in conjunction with a row accumulating table having a flat, planer surface on which rows of objects are arranged and positioned side by side in forming a two dimensional array of the objects. The formed array of objects are then typically packaged in layers in a carton, on a sheet or on a pallet.

In the preferred embodiment of the invention the row former comprises at least two row former arms or blades that are positioned side by side with a spacing slot between the parallel arms. The dimension or width of the spacing slot is determined to be slightly larger than the cross section width of the row of objects to be arranged in the slot by the row forming conveyor and then moved across the row forming conveyor and onto the row accumulating table surface. A frame holds the pair of arms in their spaced positions. An opening is provided at one end of the pair of arms and an end wall is secured between the arms at the opposite end of the pair of arms. The opening provides access into the slot between the pair of arms for a row of objects to be conveyed into the slot. The end wall at the opposite end of the arms is positioned to be engaged by the row of objects conveyed into the slot preventing the objects from exiting the opposite end of the slot and providing a reference edge for the number of objects received in the slot.

The frame of the pair of arms is operatively connected to a first drive mechanism of the row forming conveyor. The first drive mechanism selectively moves the pair of arms in a direction transverse to the lengths of the arms across the top surface of the row forming conveyor to move a row of objects across the conveyor surface. A second drive mechanism then moves the pair of arms vertically upward to a position above the row of objects where the pair of arms can then be moved horizontally back and vertically downward to the original position the arms occupied when filled with the row of objects.

The row of objects received between the pair of arms are held against relative movement by their engagement with the pair of arms and their engagement with each other as the pair of arms push the row of objects across the row forming conveyor. The leading arm of the pair of arms that is positioned in front of the row of objects pushed by the arms is provided with a plurality of protrusions. The protrusions are positioned on the downstream side of the leading arm from the slot where they each will engage with the narrower width portions of the previously arranged row of objects adjacent the arm. The protrusions are positioned in a spatial arrangement along the length of the arm and are given a predetermined length projecting from the arm. The larger width portions of the objects in the previously arranged row engage with the arm while the narrower width portions of the objects engage with the protrusions as the leading arm is swept over the row accumulating table surface pushing the row of objects before it toward the array of objects being formed on the row accumulating table surface. In the preferred embodiment, the protrusions are a plurality of pins that cantilever from the leading arm adjacent its bottom edge. The longitudinal spacing between adjacent pins is determined by a longitudinal width dimension of the objects in the row, and the extension of the pins from the leading arm is determined by the difference in the lateral width of each object between its widest width and its narrower width where the pin engages with the object.

In addition to the protrusions on the leading row former arm, an additional guide rail is added along one side of the row accumulating table surface. The guide rail extends along the side of the row accumulating table surface that is adjacent to the narrow width ends of the bottles at the ends of the rows. The guide rail is positioned perpendicular to the slot of the row former arms and is parallel to the direction of movement of the row former arms. The guide rail projects over the row accumulating table surface from the edge of the table surface to which it is attached. This positioning of the guide rail causes the object at the adjacent end of the row of objects moved across the accumulating table surface by the row former to engage with the guide rail and be tilted back slightly toward the center of the table and away from the table surface. In the preferred arrangement of rows of objects, the side of the objects arranged in rows having the smaller cross section width dimension will be positioned adjacent the guide rail, so the guide rail will be positioned on either side of the accumulating table surface so that it is adjacent the narrow width ends of the bottles. The tilting of the object at the end of each row adjacent the guide rail causes the bottom surface of the object adjacent the edge of the row accumulating table surface to be lifted from the surface, thereby decreasing the frictional engagement of the object at the end of the row with the accumulating table surface. This decreased frictional engagement of the object at the end of the row reduces forces tending to move or slightly rotate the object as the row of objects is pushed across the accumulating table surface. In this manner, the guide rail in combination with the plurality of protrusions on the leading arm of the row former prevent odd shaped objects arranged in a row from moving relative to each other as the row is moved across the surface of the row accumulating table in forming an array of the objects on the table.

By providing the overhanging guide rail and the leading arm of the pair of arms of the row former with a plurality of protrusions dimensioned and arranged as described above, the row former of the invention can move a row of irregularly shaped objects across the plane surface of the row accumulating table while preventing relative rotation or disorienting movement of the objects as they are moved across the table surface.

BRIEF DESCRIPTION OF THE DRAWINGS

Further features of the invention are set forth in the following detailed description of the preferred embodiment of the invention and in the drawing figures wherein.

DETAILED DESCRIPTION OF THE PREFERRED EMBODIMENT

Figure 1:
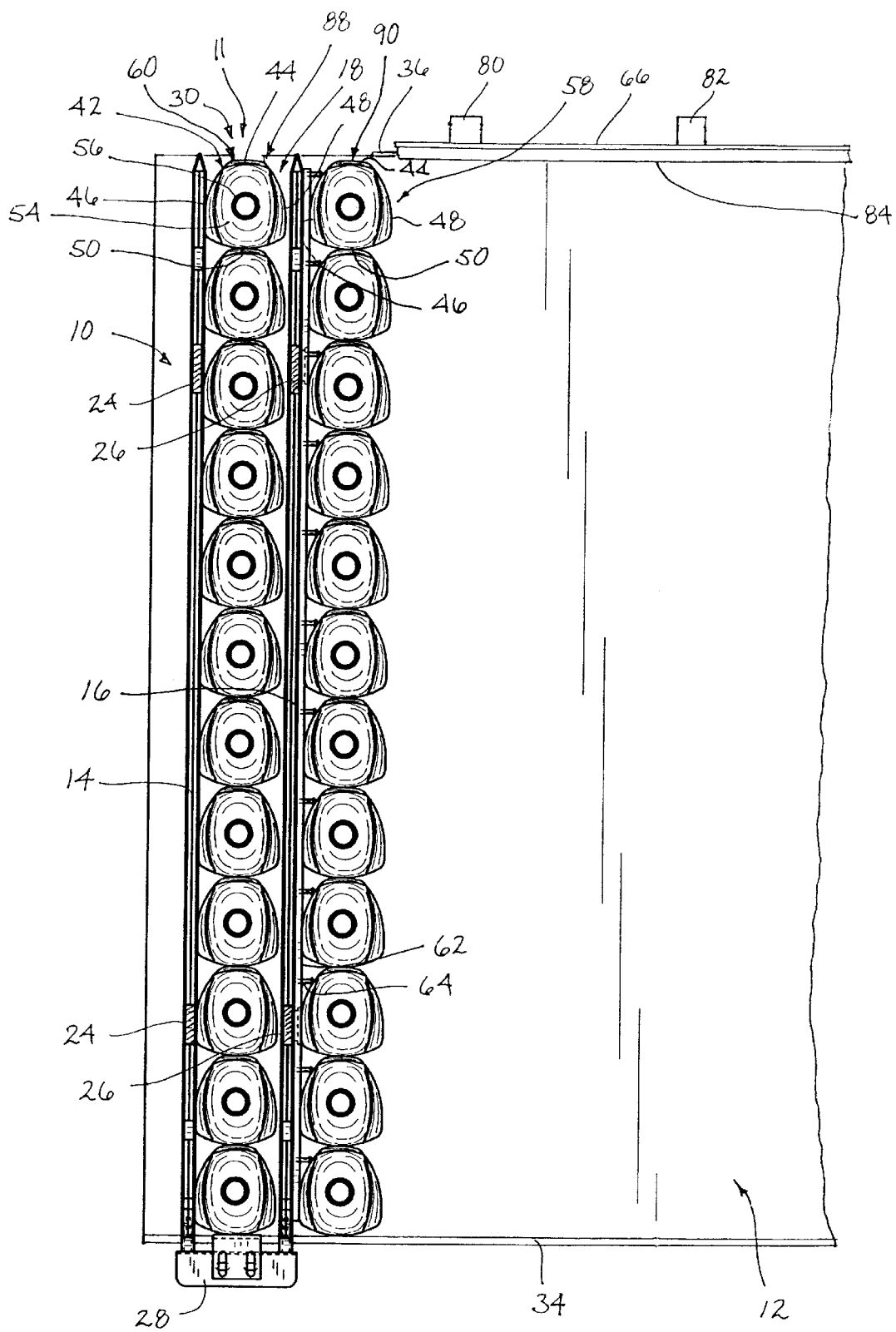
FIG. 1 is a plan view of the row former of the invention positioned over a row forming conveyor and adjacent the plane surface of a row accumulating table of a conveying system.

The row former of the present invention is designed to overcome shortcomings experienced in prior art row formers in accumulating and forming objects in arrayed rows, for example plastic blow molded bottles, where the objects have irregular or uneven cross section widths. More specifically, the row former of the invention is designed to prevent uneven shaped objects that have been arranged in a row from moving relative to each other as the row of objects is moved to form it as part of a two dimensional array of the objects being accumulated on the surface of a row accumulating table. The row former of the invention is an improvement over prior art row formers and therefore includes many component parts and/or features of prior art row formers to which the novel component parts of the invention have been added to achieve the desired operation of the row former. A partial top plan view of the row former 10 of the present invention is shown in FIG. 1 positioned above a row forming conveyor 11 and adjacent a plane surface 12 of a typical row accumulating table. As set forth above, the row former 10 makes use of many component parts of a typical row forming conveyor and accumulating table and those parts will be described first, but because they are common in typical row forming conveyors and accumulating tables they will not be described in detail. The row former includes a pair of narrow, elongate arms or blades 14, 16. Each of the arms is basically a narrow panel that extends longitudinally over the row forming conveyor 11 and adjacent the row accumulator table surface 12. The arms are positioned parallel to each other with a lateral spacing between the arms that defines a longitudinal slot 18 extending between the arms.

The arms are suspended above the row forming conveyor 11 by a support frame 20. Each arm 14, 16 is connected to a base 22 of the frame by pairs of downwardly extending legs 24, 26 that connect with the respective arms 14, 16 and suspend the arms from the frame base 22 above the row forming conveyor 11. The support frame base 22 is connected to a first drive mechanism (not shown) that is operable to move the frame 20 and the pair of arms 14, 16 together as a unit horizontally across the row forming conveyor 11 and the accumulating table surface 12 to the right as shown in FIG. 1. A second drive mechanism (not shown) then moves the arms vertically upward away from the accumulating table surface. The first drive mechanism then moves the frame horizontally to the left as shown in FIG. 1 and vertically downward toward the row forming conveyor to the original positions of the arms shown in FIG. 1.

At one end of the slot 18 between the arms, the slot is closed by an end wall 28 that is attached to the ends of the two arms. The end wall 28 connecting the ends of the arms, together with the legs 24, 26 of the frame secure the arms in their relative, parallel positions with the longitudinal slot 18 between the arms and with the pair of arms positioned slightly above the surface 12 of the row forming conveyor. A receiving opening 30 is left at the opposite end of the slot 18 between the arms. The receiving opening 30 is positioned to communicate with a conveyor (not shown) that conveys a single file stream of objects to the slot 18 between the arms. The row former 10 receives only a single row of objects from the conveyor. However, the novel features of the invention may be employed with a row former that receives two or more single file streams of objects from a conveyor. If the row former 10 of the invention were to receive two single file streams of objects from two conveyors, then an additional arm would be positioned to the left of the arms 14, 16 with an additional longitudinal slot positioned to receive the second single file stream of conveyed objects to the left of the left hand arm 14 shown in FIG. 1.

Only a portion of the plane surface 12 of the row accumulating table is shown in FIG. 1 for the purpose of explaining the operation of the novel components of the row former of the invention. Like a typical row accumulating table, the table surface 12 is a flat, smooth surface. A pair of upturned, parallel edges 34, 36 are provided at opposite sides of the surface to keep objects in their arranged rows as they are moved across the surface 12 by the arms 14, 16 in arranging multiple rows of objects in a two dimensional array as will be explained.

The description of the row former 10 to this point is for the most part conventional. As explained earlier, the row former has performed well in positioning arranged rows of objects side by side in a two dimensional array on the row accumulating table surface when the objects have shapes that are symmetric about the center axis of the object. For example, blow molded bottles having shapes that are symmetric about the center axes of the bottle necks are arranged in two dimensional arrays of the bottles on the table surface 12 with no problems. In operation of the conventional row former, the conveyor system (not shown) would be provided with a gate adjacent the receiving opening 30 of the pair of arms 14, 16. The gate would be opened so that the conveyor system could supply a number of objects to the slot 18 between the pair of arms. The lateral spacing in the pair of arms would be slightly larger than the lateral width of the objects so that the interior, mutually opposed surfaces of the arms would arrange the objects received in the slot in an orderly row. With the number of objects filling the slot 18, the conveyed stream of objects would be held back by the gate closing. The row former arms 14, 16 would then move to the right as shown in FIG. 1 causing the row of objects contained in the slot 18 to be moved a short distance to the right, the distance being slightly larger than the lateral width of the pair of arms 14, 16 and the slot 18 between the arms. The arms of the row former would then stop and move vertically upward from the row accumulating table surface 12, leaving the number of objects in the first arranged row on the table surface.

The drive mechanism moving the frame 20 of the row former would then cause the pair of arms 14, 16 to move to the left as shown in FIG. 1 to their positions in line with the conveyor, and then move the arms vertically downward to their positions just above the row forming conveyor 11 back to their position in line with the conveyor supplying the stream of objects to the row forming conveyor 11. With the slot 18 again aligned with the conveyor, the gates of the conveyor are again opened and the slot 18 between the row former arms is again filled with a number of objects, upon which the gates of the conveyor are again closed. The pair of arms 14, 16 with the row of objects filling the slot 18 between the arms are again moved the short distance to the right as shown in FIG. 1. As the pair of arms 14, 16 and the second row of objects in the slot 18 are moved across the row forming conveyor 11a sufficient distance for the arms to clear the position the arms occupy when they receive objects from the conveyor, the leading arm 16 pushes the first arranged row of objects before the arm, causing the first arranged row to slide a short distance across the row accumulating table surface 12. When the pair of arms have completed their movement to the right, the drive mechanism of the frame support 20 again causes the arms to be raised vertically upward, and moved horizontally to the left and moved vertically downward to their positions shown in FIG. 1 where they will receive the next number of objects arranged in a row in the slot between the row forming arms. The sequence of movements of the arms 14, 16 are repeated with previously arranged rows of objects on the row accumulating table surface 12 being pushed across the table surface by subsequently arranged rows of objects that are in turn pushed across the table surface by the movement of the leading arm 16, thereby positioning rows of numbers of objects side by side in forming a two dimensional array of the objects on the row accumulating table surface.

As set forth earlier, because objects previously arranged in arrays on the row accumulating table surface have had shapes that were symmetric about their center vertical axes, if the objects rotated or moved slightly about their center axes as the leading arm 16 pushed the row of objects across the table surface the movement would not alter the relative positions of the bottle in the row or the relative positions of bottles in the two dimensional array formed on the table surface. However, when the conventional row former was employed in forming two dimensional arrays of objects having uneven width cross sections, relative movement of the objects in the rows pushed across the table surface would result in a disorganized arrangement of bottles in the two dimensional array that could interfere with the later palletizing of the two dimensional array of objects.

Figure 2:
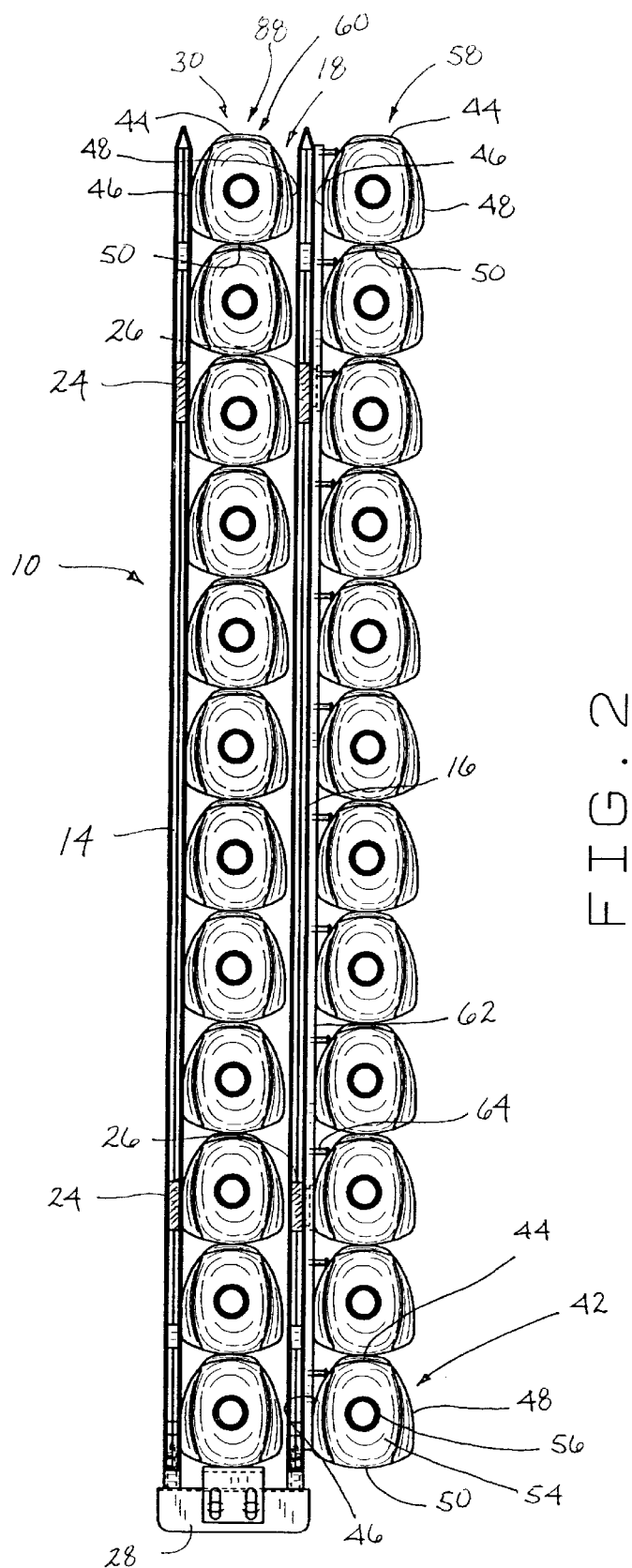
FIG. 2 is a plan view of the row former removed from its position over the row forming conveyor.

FIG. 1 shows examples of objects that can be arranged in rows and then in two dimensional arrays by the improved row former of the invention where the objects have cross section widths that are uneven. In the example shown in FIG. 1 as well as FIGS. 2 and 3, the objects shown are blow molded plastic bottles having uneven cross section widths. However, the blow molded plastic bottles used in explaining the operation of the row former of the invention are only one example of objects having uneven cross section widths with which the row former of the invention may be used. The objects, or bottles 42 shown in FIG. 1 have a general trapezoidal shaped cross section width. This shape of the bottles results from providing the bottles with a handle formed on a side of the bottle by molding pinched in indentations at the side of the bottle. This results in the bottle having a narrow end 44 adjacent the pinched in indentations, opposite sides 46, 48 in which the indentations are formed and a wide end 50 opposite the narrow end 44. Each of the bottles also has a bottom surface 52 that is also generally trapezoidal in shape, and a top surface 54 that merges to the cylindrical bottle neck 56. The shapes of the bottles give them an irregular or uneven width cross section. A horizontal cross section through the bottle between its bottom surface 52 and top surface 54 would have a shape basically the same as the outer perimeter of the bottles when viewed from the top as shown in FIG. 1. If the first arranged row of bottles 58 shown in FIG. 1 were pushed to the right by the leading arm 16 of the row former, the shapes of the bottles would result in friction forces of the row forming conveyor and the row accumulating table surface 12 tending to cause the bottles to move in a general counterclockwise direction about their bottle necks 56 as shown in FIG. 1. Although the bottles are contacted on three sides, with the wide end 50 of the bottles either contacting with a table edge 34 or a narrow end 44 of an adjacent bottle, and with one side 46 of the bottle contacting the leading arm 16 of the row former, the contact of the leading arm 16 with the bottle side 46 is off centered relative to the center vertical axis of the bottle neck 56. Thus, as the leading arm 16 moves the row of bottles across the row forming conveyor 11 and the accumulator table surface 12 to the right, the friction forces exerted on the bottom surfaces 52 of the bottles will tend to move some of the bottles in a counter-clockwise direction about the center axes of the bottle necks 56. The forces tending to move the bottles are even more influential on the bottle 60 at the end of the row adjacent the receiving opening 30 of the slot because this bottle is only in two point contact, with its wide end 50 engaging the narrow end 44 of the adjacent bottle and its left side 46 engaging the leading arm 16.

The row former of the invention provides modifications to the row former shown in FIG. 1 to avoid the bottle movement problem. The present invention basically includes a side bar 62 with a plurality of protrusion 64 and a guide rail 66.

Figure 3:
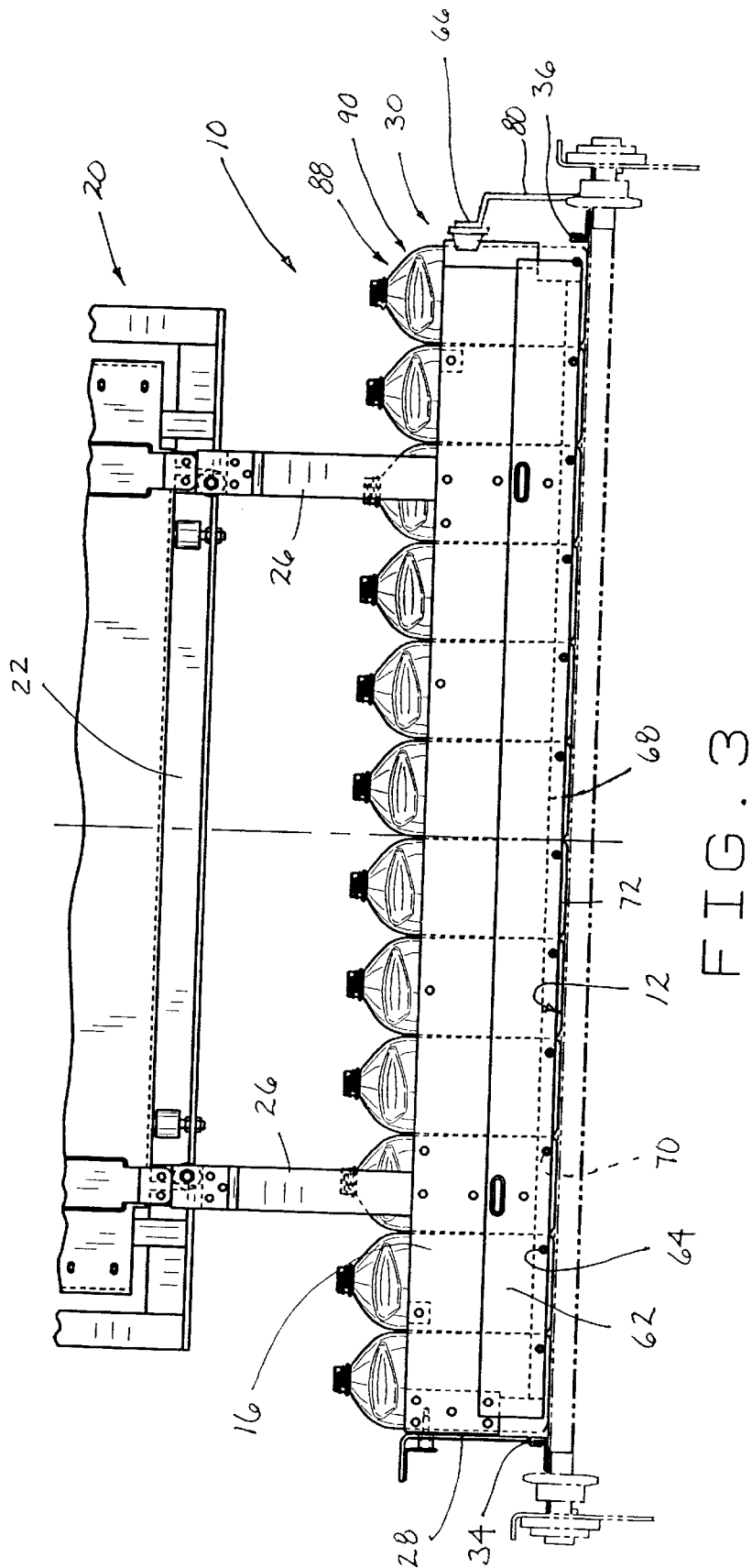
FIG. 3 is a side elevation view over the plane surface of the row accumulating table showing the side of the leading arm of the row former and the frame that supports the arms of the row former.
Figure 4:
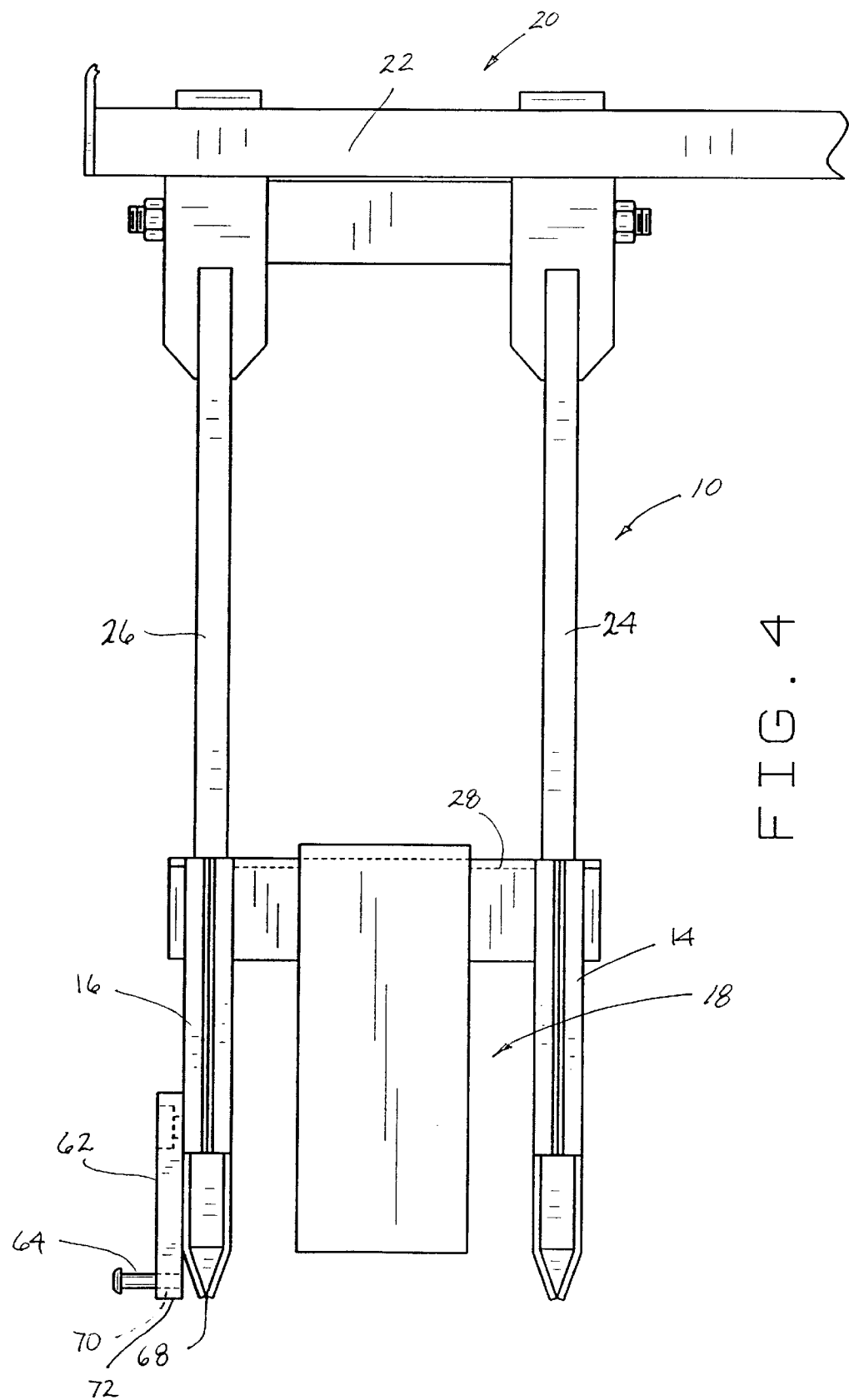
FIG. 4 is an end elevation view of the end wall connecting the two arms of the row former and of the frame supporting the arms of the row former; and, FIG. 5 is a partial perspective view of the guide rail tilting an end bottle of a row on the row accumulating table surface.
Figure 5:
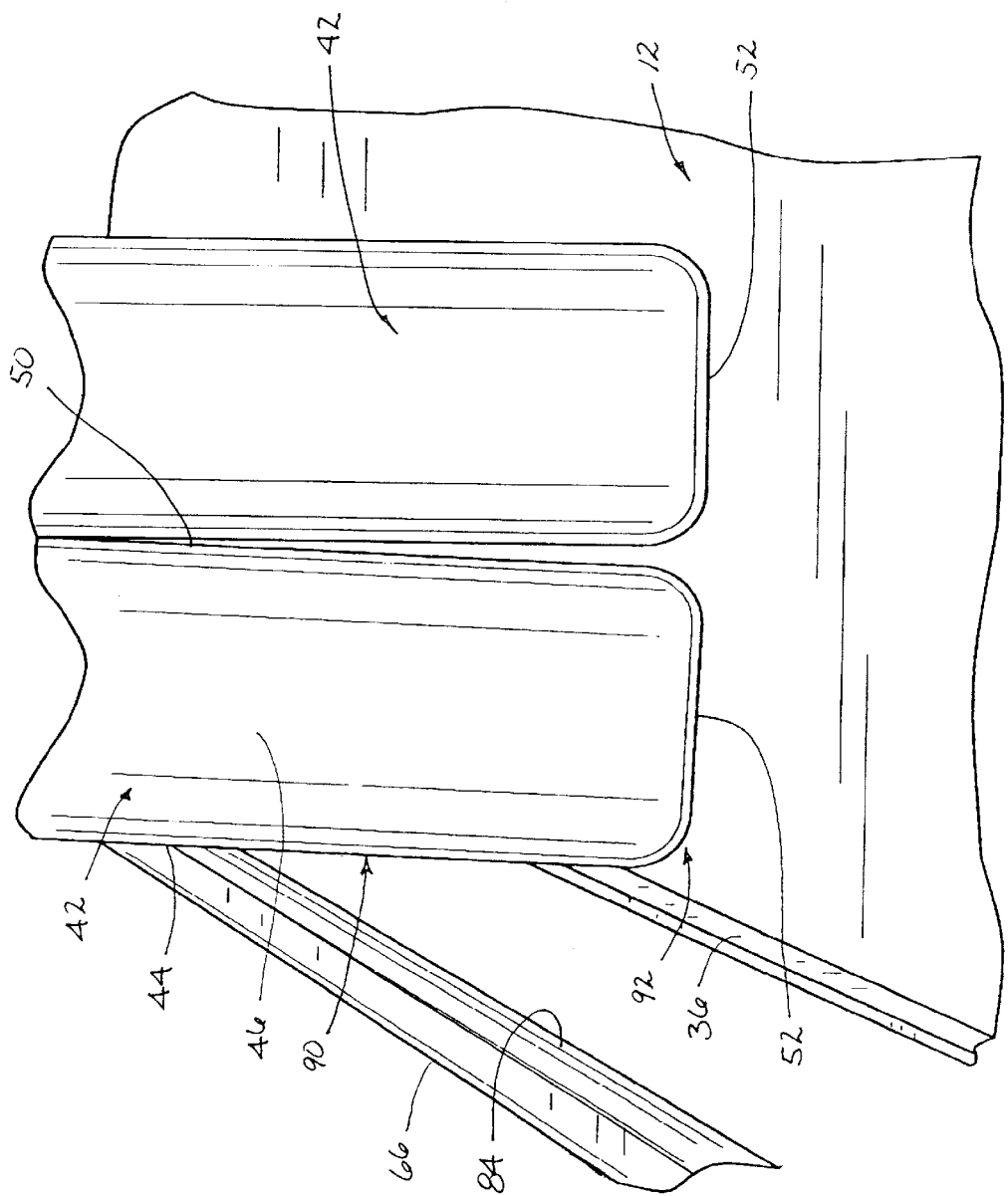

The side bar 62 has an elongated, rectangular shape with a length slightly smaller than that of the row former arms 14, 16. The bar 62 is secured to the leading arm 16 adjacent its bottom edge 68 and on an opposite side of the arm from the slot 18. The bar 62 can be secured to the leading arm 16 by mechanical fasteners, for example screws, or other equivalent means. The bar 62 is provided with a plurality of internally screw threaded holes 70 spacially arranged adjacent the bottom edge 72 of the bar as seen in FIGS. 3 and 4. Each of the screw holes 70 are spaced a longitudinal distance from each other that corresponds to the width dimension of the bottles 42 measured across the bottles between their narrow end 44 and wide end 50. The plurality of protrusions 64, in the illustrated embodiment a plurality of pins or screws, are screw threaded into the screw holes 70 with portions of the lengths of the pins projecting outwardly from the side bar 62. The number of protrusions is equal to the number of objects or bottles received in the slot. The length of the portion of the pin that projects outwardly from the side bar 62 is determined based on the shape of the bottle 42 or object being arranged in rows by the row former.

To adjust the row former to form rows of objects with different shapes, the side bar with the pins attached can be removed and replaced with another side bar having pin spacings and lengths for the particular shapes of the objects.

The guide rail 66 has a narrow, elongated length and is positioned adjacent the table surface edge 36 on the side of the table adjacent the bottles at the ends of the rows that have their narrow width ends 44 positioned at the ends of the rows. The rail 66 extends parallel to the table edge 36 but is held in a position by brackets 80, 82 that position the guide rail 66 slightly inward from the table edge 36 over the table surface 12. The extent to which the guide rail 66 is spaced inwardly from the table edge 36 and overhangs the table surface 12 is exaggerated in the drawing figures for illustrative purposes. As seen in FIG. 1, the guide rail 66 extends parallel along the table edge 36 but stops short of the area of the table occupied by the pair of row forming arms 14, 16. The guide rail 66 is provided with a sliding surface 84 that will engage with narrow sides 44 of bottles 42 being pushed across the table surface 12 by the row former arms 14, 16 without appreciably restricting the movement of the bottles.

FIG. 1 shows the first row of bottles 58 that have been previously formed and pushed by the pair of arms 14, 16 on the row accumulating table surface 12 and a second row of bottles 88 received in the slot 18 of the row former from the conveyor system (not shown). As seen in FIG. 1, each of the bottles of the rows are received from the conveyor system in the slot 18 of the row former with each bottle of the row having the same orientation. The row of bottles 88 are fed into the slot 18 with the wide ends 50 of the bottles directed into the slot. The lateral dimension of the slot 18 is just wide enough to receive the bottles in the orientations shown with the opposite left 46 and right 48 sides of the bottles as shown in FIG. 1 sliding across the mutually opposed surfaces of the pair of arms 14, 16 as the row of bottles enters the slot. Each of the bottles in the row 88 in the slot 18 is basically in three point contact as the arms 14, 16 begin to move to the right as shown in FIG. 1. The narrow end 44 and wide end 50 of each bottle is in contact with an adjacent bottle or the end wall 28 of the row former and the left side 46 of each bottle is in contact with the left arm 14 of the row former. However, if any of the bottles tends to rotate about the center vertical axis of the bottle neck 56, the side of the bottle 48 adjacent the leading arm 16 will engage against the leading arm and thereby prevent any further movement of the bottle from its orientation shown in FIG. 1. However, some disorienting movement of the bottles will occur, requiring that the bottles be again arranged in an orderly row.

When the row of bottles is formed and pushed onto the accumulator table surface 12 and the row former arms 14, 16 are removed from the opposite sides of the bottles in the row, then the plurality of protrusion 64 of the invention together with the guide rail 66 prevent the bottles from moving or rotating about the center vertical axes of their necks 56 as the leading arm 16 pushes the next formed row of bottles across the accumulator table surface 12. As seen in FIG. 1, each of the protrusions 64 are adjusted so that the length they extend from the side bar 62 corresponds to the gap or space between the leading arm 16 and the narrow end 44 of the adjacent bottle in the previously formed row 58. In addition, the longitudinal spacing of the protrusions 64 along the length of the leading arm 16 is determined to position the protrusions 64 adjacent the narrow ends 44 of the bottles in the row. By providing the row former with the protrusions 64 of the invention, each of the bottles in the previously formed row 58 is in four point contact, with the wide end 50 of each bottle contacting either the table edge 34 or a narrow end 44 of an adjacent bottle, and with two portions of the left sides 46 of each bottle contacting the leading arm 16 and one of the protrusions 64. In this manner, the protrusions 64 prevent relative movement of the bottles in the previously formed row 58 as the row former arms 14, 16 move the row of bottles across the row accumulating table surface 12.

It is pointed out that the bottle 90 at the end of the previously formed row 58 adjacent the receiving opening 30 of the pair of arms is not in four point contact. The wide end 50 of the bottle does contact an adjacent bottle and two portions of the left side 46 of the bottle contact the leading arm 16 and a protrusion 64, however there is not a bottle present to engage in the fourth point of contact on the narrow end 44 of the bottle as is present for the remaining bottles in the row. The guide rail 66 of the invention provides the fourth point of contact.

As the row former arms 14, 16 begin to move the previously formed row of bottles 58 to the right as shown in FIG. 1, the narrow end of the end bottle 90 comes into contact with the sliding surface 84 of the guide rail. Because the guide rail 66 overhangs the table edge 36, engagement of the rail sliding surface 84 with the end bottle 90 will cause the bottle to tilt to the left as viewed in FIG. 3. Engagement of the guide rail sliding surface 84 with the bottle 90 provides the fourth point of contact that resists movement of the bottle about the center axis of its neck 56 as the bottle is pushed across the row accumulating table surface 12. In addition, the engagement of the sliding surface 84 with the bottle 90 causing it to tilt to the left as viewed in FIG. 3 lifts a portion of the bottle bottom surface 52 on the right side 92 of the bottle above the table surface 12. This reduces the frictional forces exerted on the bottom surface of the bottle that tend to rotate it about the center axis of the bottle neck and thereby further resists any movement of the bottle as the bottle is pushed by the leading arm 16 across the row accumulating table surface 12.

By providing the overhanging guide rail 66 and the protrusions 64 on the leading arm 16 of the row former, the row former of the invention can move a row of irregularly or uneven width cross section objects across the row forming conveyor 11 and the surface 12 of the row accumulating table and prevent relative movement or rotation of the objects as they are moved across the table surface.

While the present invention has been described by reference to a specific embodiment, it should be understood that modifications and variations of the invention may be constructed without departing from the scope of the invention as defined by the following claims.

What is claimed is:

1. A row former that is moved vertically and horizontally relative to a row forming plane of a conveyor to form rows of objects conveyed by the conveyor on the row forming plane, the row former comprising:

an arm having a length that extends across the forming plane, the arm having first and second surfaces on opposite sides of the arm that extend along the length of the arm; and, a plurality of protrusions on the arm, the protrusions projecting outwardly from the arm first surface to distal ends of the protrusions and are spatially arranged along the length of the arm with an equal spacing distance between adjacent protrusions where the spacing distance is determined from a dimension of the object to be formed in rows by the row former arm so that each protrusion distal end and a portion of the arm first surface will engage against one side of each object formed in a row by the row former.

2. The row former of claim 1, wherein:

the arm is straight along its length and has laterally opposite first and second sides, the plurality of protrusions are spatially arranged along the first side and the second side is flat.

3. The row former of claim 1, wherein:

the arm is a first arm of the row former and a second arm is rigidly connected to the first arm with a spacing slot between the first and second arms that is dimensioned to accommodate a row of objects between the first and second arms.

4. The row former of claim 1, wherein:

the plurality of protrusions project from the arm parallel to each other.

5. The row former of claim 1, wherein:
the plurality of protrusions project from the arm at right angles relative to the arm.

6. The row former of claim 1, wherein:
the plurality of protrusions are removable from the arm and have lengths that project from the arm that are changeable.

7. The row former of claim 1, wherein:
the plurality of protrusions project from a bar that is removably attached to the arm.

8. The row former of claim 1, wherein:
the arm has laterally opposite sides and the plurality of protrusions are arranged on only one side of the arm.

9. The row former of claim 8, wherein;
the side of the arm that is opposite the one side of the arm with the plurality of protrusions is flat with no protrusions.

10. A row former for forming rows of objects on a plane, the row former comprising:
a forming arm having a length that extends longitudinally across the plane;
a plurality of protrusions on the arm that extend laterally from the arm; and
a guide rail that extends laterally across the plane.

11. The row former of claim 10, wherein;
the plurality of protrusions are equally spaced from each other by a spacing distance that is determined from a dimension of the object to be formed in rows by the row former arm.

12. The row former of claim 10, wherein:
the plurality of protrusions extend from one side of the arm and an opposite side of the arm is flat with no protrusions.

13. The row former of claim 10, wherein:
the arm is a first arm of the row former and a second arm is connected to the first arm with a spacing slot between the first and second arms with the spacing slot being laterally dimensioned to accommodate a row of objects in the slot.

14. A row former for forming rows of objects on a plane, the row former comprising:
a forming arm having a longitudinal length that is dimensioned to extend across a forming plane on which objects are to be collected and formed in rows, the arm having first and second surfaces on opposite sides of the arm that extend along the length of the arm; and,
a plurality of protrusions that extend laterally from the first surface of the arm to distal ends of the protrusions and are longitudinally, spatially arranged along the length of the arm with adjacent protrusions being equally spaced apart by a distance that is determined from a dimension of the objects to be formed in rows so that each protrusion distal end and a portion of the arm first surface will engage against one side of each object formed in a row.

15. The row former of claim 14, wherein:
a side of the arm that is opposite the one side of the arm with the plurality of protrusions has a flat surface with no protrusions.

16. The row former of claim 14, wherein:
the arm has opposite top and bottom edges and the plurality of protrusions are positioned nearer the arm bottom edge.

17. The row former of claim 14, wherein:
the arm is a first arm of the row former and a second arm is rigidly connected to the first arm with a spacing slot between the first and second arms that is dimensioned to accommodate a row of objects between the first and second arms.

18. The row former of claim 14, wherein:
the plurality of protrusions have lengths that project from the arm that are changeable.

19. The row former of claim 14, wherein:
the plurality of protrusions project from a bar that is removably attached to the arm.

20. A row former that is moved vertically and horizontally relative to a row forming plane of a conveyor to form rows of objects conveyed by the conveyor on the forming plane, the row former comprising:
an arm having a length that extends across the forming plane;
a plurality of protrusions on the arm that are spatially arranged along the length of the arm with an equal spacing distance between adjacent protrusions where the spacing distance is determined from a dimension of the object to be formed in rows by the row former arm; and,
a guide rail is positioned over the row forming plane where it will engage with one object of each row of objects formed on the forming plane.

21. A row former that is moved vertically and horizontally relative to a row forming plane of a conveyor to form rows of objects conveyed by the conveyor on the forming plane, the row former comprising:
an arm having a length that extends across the forming plane;
a plurality of protrusions on the arm that are spatially arranged along the length of the arm with an equal spacing distance between adjacent protrusions where the spacing distance is determined from a dimension of the object to be formed in rows by the row former arm; and,
the plurality of protrusions are pins that project outward from the arm.

22. A row former for forming rows of objects on a plane, the row former comprising:
a forming arm having a longitudinal length that is dimensioned to extend across a forming plane on which objects are to be collected and formed in rows;
a plurality of protrusions that extend laterally from one side of the arm and are longitudinally, spatially arranged along the length of the arm with adjacent protrusions being equally spaced apart by a distance that is determined from a dimension of the objects to be formed in rows; and,
the plurality of protrusions are a plurality of pins that cantilever from the arm.

23. A row former for forming rows of objects on a plane, the row former comprising:
a forming arm having a longitudinal length that is dimensioned to extend across a forming plane on which objects are to be collected and formed in rows;
a plurality of protrusions that extend laterally from one side of the arm and are longitudinally, spatially arranged along the length of the arm with adjacent protrusions being equally spaced apart by a distance that is determined from a dimension of the objects to be formed in rows; and,
a guide rail is positioned over the row forming plane where it will engage with one object of each row of objects formed on the row forming plane.

* * * * *